US009756839B2

(12) United States Patent
Nakanishi

(10) Patent No.: US 9,756,839 B2
(45) Date of Patent: Sep. 12, 2017

(54) FISHING LINE COMPRISING INTEGRATED COMPOSITE YARN COMPRISING SHORT FIBER

(71) Applicant: Y.G.K CO., LTD., Hyogo (JP)

(72) Inventor: Shigeru Nakanishi, Hyogo (JP)

(73) Assignee: Y.G.K. CO., LTD., Hyogo (JP)

( * ) Notice: Subject to any disclaimer, the term of this patent is extended or adjusted under 35 U.S.C. 154(b) by 194 days.

(21) Appl. No.: 14/506,925

(22) Filed: Oct. 6, 2014

(65) Prior Publication Data
US 2015/0020435 A1 Jan. 22, 2015

Related U.S. Application Data

(62) Division of application No. 13/063,620, filed as application No. PCT/JP2009/005305 on Oct. 13, 2009, now abandoned.

(30) Foreign Application Priority Data

Oct. 14, 2008 (JP) .................... 2008-265128

(51) Int. Cl.
A01K 91/00 (2006.01)
D02G 3/44 (2006.01)
D02G 3/36 (2006.01)
D02G 3/40 (2006.01)

(52) U.S. Cl.
CPC ............ *A01K 91/00* (2013.01); *D02G 3/36* (2013.01); *D02G 3/40* (2013.01); *D02G 3/44* (2013.01); *D02G 3/444* (2013.01)

(58) Field of Classification Search
CPC ..................................... A01K 91/00
USPC ........................... 43/44.98; 57/5, 7
See application file for complete search history.

(56) References Cited

U.S. PATENT DOCUMENTS

| | | | | |
|---|---|---|---|---|
| 3,250,602 A * | 5/1966 | Stalego | ............ | C03B 37/045 156/167 |
| 3,403,503 A * | 10/1968 | Van Scoy | ............ | D07B 5/06 57/211 |
| 4,321,854 A * | 3/1982 | Foote | ............ | A01K 91/00 43/44.98 |
| 4,521,483 A * | 6/1985 | Sasaki | ............ | D01F 8/10 264/172.15 |
| 4,527,384 A * | 7/1985 | Stejskal | ............ | D01H 4/08 57/404 |
| 5,061,561 A * | 10/1991 | Katayama | ............ | D01F 6/12 428/364 |
| 5,392,588 A * | 2/1995 | Morrison | ............ | D01H 1/11 57/224 |
| 5,456,983 A * | 10/1995 | Sassa | ............ | B01D 39/083 428/221 |
| 5,497,608 A * | 3/1996 | Matsumoto | ............ | D02G 3/38 57/2 |
| 5,525,426 A * | 6/1996 | Kulzick | ............ | B32B 7/12 428/412 |
| 5,555,716 A * | 9/1996 | Dugan | ............ | D02G 3/36 57/210 |
| 5,571,296 A * | 11/1996 | Barber, Jr. | ............ | A46D 1/00 427/407.1 |
| 5,616,411 A * | 4/1997 | Barber, Jr. | ............ | A46D 1/00 428/364 |
| 5,659,994 A * | 8/1997 | Cutter | ............ | A01K 91/12 43/44.98 |
| 5,679,190 A * | 10/1997 | Riedel | ............ | C09J 7/04 156/209 |
| 5,701,730 A * | 12/1997 | Kennedy | ............ | F21H 1/04 57/210 |
| 5,737,794 A * | 4/1998 | Barber, Jr. | ............ | A46D 1/00 15/229.12 |
| 5,771,673 A * | 6/1998 | Lorch | ............ | A01K 91/00 57/232 |
| 5,881,492 A * | 3/1999 | Abiru | ............ | A01K 91/00 43/44.98 |
| 6,074,751 A * | 6/2000 | Murakami | ............ | D01H 1/18 428/364 |

(Continued)

FOREIGN PATENT DOCUMENTS

| | | | | |
|---|---|---|---|---|
| CN | 101205647 | 6/2008 | | |
| DE | 4402630 C1 * | 8/1995 | ............ | A01K 91/00 |

(Continued)

OTHER PUBLICATIONS

Translation of JP093742.*
Translation of JP02305881.*
Translation of JP02305882.*
Translation of JP2003116431.*
Translation of JP2003134979.*
Translation of JP2007135500.*
International Search Report issued Jan. 19, 2010 in International (PCT) Application No. PCT/JP2009/005305.
English translation of the International Preliminary Report on Patentability and Written Opinion dated May 17, 2011.

(Continued)

*Primary Examiner* — Darren W Ark
(74) *Attorney, Agent, or Firm* — Wenderoth, Lind & Ponack, L.L.P.

(57) ABSTRACT

The present invention provides a fishing line comprising a composite yarn having a core-sheath structure, where the composite yarn comprises a core part having a core yarn containing a short fiber and a sheath part having a sheath yarn containing a long fiber; the long fiber in the sheath part and the short fiber in the core part are intertangled with each other; and the core yarn and the sheath yarn are integrated with use of an adhesive resin.

The fishing line of the present invention has a robust core-sheath structure which prevents nude yarn or nep from being developed, excellent operability, adjustable specific gravity, excellent tensile strength, high weatherability and water resistance, low water content, low elongation rate, and low probability of unraveling constituent fibers at a cut site.

5 Claims, No Drawings

(56) References Cited

U.S. PATENT DOCUMENTS

| | | | | |
|---|---|---|---|---|
| 6,148,597 A * | 11/2000 | Cook | ................. | D02G 3/40 |
| | | | | 428/364 |
| 6,174,601 B1 * | 1/2001 | Stanitis | ................. | D01F 8/06 |
| | | | | 264/172.15 |
| 6,244,031 B1 * | 6/2001 | Murakami | ................. | D01H 1/18 |
| | | | | 28/249 |
| 6,658,835 B1 * | 12/2003 | Bowers | ................. | D02G 3/445 |
| | | | | 57/210 |
| 6,671,997 B2 * | 1/2004 | Lindgren | ................. | A01K 91/00 |
| | | | | 43/44.98 |
| 6,855,423 B2 * | 2/2005 | Fidan | ................. | D02G 3/38 |
| | | | | 152/451 |
| 7,081,298 B2 * | 7/2006 | Nakanishi | ................. | A01K 91/00 |
| | | | | 428/372 |
| 7,401,459 B2 * | 7/2008 | Bloch | ................. | A01K 91/00 |
| | | | | 57/230 |
| 7,401,460 B2 * | 7/2008 | Bloch | ................. | D02G 3/06 |
| | | | | 57/230 |
| 7,402,217 B2 * | 7/2008 | Bowers | ................. | D02G 3/445 |
| | | | | 156/72 |
| 8,022,160 B2 * | 9/2011 | Dirks | ................. | D01F 6/04 |
| | | | | 264/291 |
| 8,022,171 B2 * | 9/2011 | Goossens | ................. | D01F 6/04 |
| | | | | 264/291 |
| 8,181,438 B2 * | 5/2012 | Cook | ................. | A01K 91/00 |
| | | | | 57/238 |
| 8,193,264 B2 * | 6/2012 | Kumazawa | ................. | C08L 67/00 |
| | | | | 524/243 |
| 8,522,473 B2 * | 9/2013 | Nakanishi | ................. | A01K 91/00 |
| | | | | 43/44.98 |
| RE45,778 E * | 10/2015 | Cook | | |
| 9,334,587 B2 * | 5/2016 | Clough | ................. | A01K 91/00 |
| 9,439,410 B2 * | 9/2016 | Toddes | ................. | D04C 1/12 |
| 2002/0127398 A1 * | 9/2002 | Andrews | ................. | D02G 3/185 |
| | | | | 428/370 |
| 2003/0205041 A1 * | 11/2003 | Baker Jr. | ................. | D02G 3/40 |
| | | | | 57/224 |
| 2003/0211799 A1 * | 11/2003 | Yao | ................. | D01F 8/06 |
| | | | | 442/361 |
| 2004/0194444 A1 * | 10/2004 | Vinod | ................. | D02G 3/38 |
| | | | | 57/243 |
| 2006/0174536 A1 * | 8/2006 | Nakanishi | ................. | A01K 75/00 |
| | | | | 43/44.98 |
| 2006/0258249 A1 * | 11/2006 | Fairbanks | ................. | B32B 5/022 |
| | | | | 442/329 |
| 2007/0269654 A1 * | 11/2007 | Veillat | ................. | D02G 3/22 |
| | | | | 428/364 |
| 2009/0227166 A1 * | 9/2009 | Goda | ................. | D01F 8/14 |
| | | | | 442/364 |
| 2011/0020645 A1 * | 1/2011 | Nakanishi | ................. | A01K 91/00 |
| | | | | 428/359 |
| 2011/0173873 A1 * | 7/2011 | Nakanishi | ................. | A01K 91/00 |
| | | | | 43/44.98 |
| 2012/0021216 A1 * | 1/2012 | Veillat | ................. | D02G 3/22 |
| | | | | 428/360 |
| 2012/0285074 A1 * | 11/2012 | Yang | ................. | D04C 1/12 |
| | | | | 43/44.98 |
| 2016/0366867 A1 * | 12/2016 | Nakanishi | ................. | A01K 91/00 |

FOREIGN PATENT DOCUMENTS

| | | | |
|---|---|---|---|
| JP | 02305881 A | * | 12/1990 |
| JP | 02305882 A | * | 12/1990 |
| JP | 07090740 | | 4/1995 |
| JP | 07090740 A | * | 4/1995 |
| JP | 8-140538 | | 6/1996 |
| JP | 9-3742 | | 1/1997 |
| JP | 09003742 | | 1/1997 |
| JP | 09003742 A | * | 1/1997 |
| JP | 11103737 | | 4/1999 |
| JP | 11103737 A | * | 4/1999 |
| JP | 2001064839 | | 3/2001 |
| JP | 2001064839 A | * | 3/2001 |
| JP | 2003116431 A | * | 4/2003 |
| JP | 2003134979 A | * | 5/2003 |
| JP | 2004-308047 | | 11/2004 |
| JP | 2004308047 | | 11/2004 |
| JP | 2004308047 A | * | 11/2004 |
| JP | 2006-314324 | | 11/2006 |
| JP | 2007-135500 | | 6/2007 |
| JP | 2007135500 | | 6/2007 |
| JP | 2007135500 A | * | 6/2007 |
| WO | 2009/116381 | | 9/2009 |

OTHER PUBLICATIONS

Fiber and Fabric Properties 2005.
"Hot-melt adhesive", Wikipedia, the free encyclopedia, website accessed on Jul. 22, 2014, website: http://en.wikipedia.org/wiki/Hot-melt_adhesive, pp. 1-6.

* cited by examiner

FISHING LINE COMPRISING INTEGRATED COMPOSITE YARN COMPRISING SHORT FIBER

TECHNICAL FIELD

The present invention relates to a fishing line. More specifically, the present invention relates to a fishing line comprising an integrated composite yarn comprising a short fiber.

BACKGROUND ART

In recent years, advancement of fishing lines has been remarkable and fishing lines of different properties tailored to various modes of fishing have been developed. Inter alia, braided yarns and covered yarns having a core-sheath structure composed of two or more kinds of fibers including high strength fibers, such as ultra high molecular weight polyethylene fibers, aramid fibers, PBO fibers, polyarylate fibers and glass fibers, have attracted attention because they have high strength, durability and low rate of elongation suitable for easy and correct perception of a fish strike.

Already known as such a fishing line having a core-sheath structure composed of two or more kinds of fibers are a fishing line which is a covered yarn comprising a synthetic resin multifilament yarn as a core yarn and a twisted synthetic resin multifilament yarn as a sheath yarn wound around the core yarn, the difference between the angle between the core yarn and the sheath yarn and the twist angle of the twisted yarn being 25° or less thereby achieving an excellent breaking strength and knot strength, low rate of elongation and an excellent abrasion resistance (Patent Literature 1); a fishing line comprising a fluorine multifilament fiber as a core yarn and an ultra high molecular weight polyethylene fiber braided around the core yarn, which sinks below water surface, is not easily affected by wind etc., and has a strong abrasion resistance (Patent Literature 2); and a yarn comprising a glass fiber core yarn and two or more sheath yarns made of a fiber other than glass fiber, the sheath yarns being braided around the core yarn, the core yarn and the sheath yarns being integrated with use of a binder resin, the yarn having an elongation rate of 5% or less (Patent Literature 3).

However, these conventional core-sheath fishing lines do not have sufficient degree of entwinement or binding between the core part and the sheath part. Therefore, such fishing lines have problems that the core part and the sheath part separate from each other and the core yarn slips off, resulting in so-called nude yarn and that friction between the line guide of a fishing rod etc. and the fishing line causes the sheath part to separate and partially form an unorganized mass, so-called nep.

Meanwhile, a fishing line of which the core part and the sheath part are integrated by means of thermal fusion bonding or a binder also has a problem of hardening of the yarn, and resulting curliness and difficulty in handling.

In addition, a fishing line made of a super strength fiber, such as an ultra high molecular weight polyethylene filament, has a relatively small specific gravity, and therefore is easily affected by wind or tide. Furthermore, in fast tidal stream or in a deep-water area, it is difficult to quickly and accurately throw the fishing line into a fishable depth range. In recent years, there is a demand from the market for a fishing line with a specific gravity most suitable for a particular situation, such as in adverse weather conditions or in an area with rapidly changing tidal streams. In this context, development of a yarn with a specific gravity of 1.0 or more, preferably adjustable in the range of 1.0 or more, has been desired.

Meanwhile, fishing lines comprising two or more yarns integrated with use of a resin coating have been known. Examples of the known fishing lines include a fishing line comprising two or more filament yarns integrated with use of a hot-melt adhesive and thereby having both advantages of a monofilament fishing line and of a braided fishing line (Patent Literature 4) and a fishing line comprising a yarn comprising two or more polyolefin fibers, wherein the surface of the yarn is coated with a resin containing dispersed metal powder particles, resulting in an increased specific gravity of the fishing line (Patent Literature 5).

CITATION LIST

Patent Literatures

[Patent Literature 1] JP-A-09-31786
[Patent Literature 2] JP-A-08-140538
[Patent Literature 3] JP-A-2004-308047
[Patent Literature 4] JP-A-2003-116431
[Patent Literature 5] JP-A-04-335849

SUMMARY OF INVENTION

Technical Problem

An object of the present invention is to solve the above-mentioned problems of conventional fishing lines having a core-sheath structure and thereby provide a fishing line having a robust core-sheath structure which prevents nude yarn or nep from being developed, excellent operability, adjustable specific gravity, excellent tensile strength, high weatherability and water resistance, low water content, low elongation rate, and low probability of unraveling constituent fibers at a cut site.

Solution to Problem

To solve the above problems, the present invention includes the following:
(1) a fishing line comprising a composite yarn having a core-sheath structure, the composite yarn comprising a core part having a core yarn containing a short fiber and a sheath part having a sheath yarn containing a long fiber, the core yarn and the sheath yarn being integrated with use of an adhesive resin,
(2) the fishing line according to the above (1), wherein single yarns of the short fiber in the core yarn are overlapped, intertangled or intertwisted,
(3) the fishing line according to the above (1) or (2), wherein the fiber length of the short fiber in the core yarn is 5 to 500 mm,
(4) the fishing line according to any of the above (1) to (3), wherein the specific gravity of the short fiber in the core yarn is 1.0 or more,
(5) the fishing line according to any of the above (1) to (4), wherein the short fiber in the core yarn is used for adjusting the specific gravity of the fishing line,
(6) the fishing line according to any of the above (1) to (5), wherein the short fiber in the core yarn comprises at least one kind selected from the group consisting of a synthetic fiber, a regenerated fiber, a metal fiber, a ceramic fiber, and a glass fiber, (7) the fishing line according to any of the above (1) to (6), wherein the short fiber in the core yarn comprises a polyester fiber, a glass fiber, or a fluororesin,
(8) the fishing line according to any of the above (1) to (7), wherein the long fiber in the sheath yarn comprises a super strength fiber,
(9) the fishing line according to any of the above (1) to (8), wherein the super strength fiber comprised in the long fiber in the sheath yarn accounts for 12% by weight or more of the whole composite yarn,
(10) the fishing line according to above (8) or (9), wherein the super strength fiber is an ultra high molecular weight polyethylene fiber having a molecular weight of 300,000 or more,
(11) the fishing line according to any of the above (1) to (10), wherein the sheath yarn in the sheath part is braded around the core yarn,
(12) the fishing line according to any of the above (1) to (10), wherein the sheath yarn in the sheath part is wound around the core yarn,
(13) the fishing line according to any of the above (1) to (12), wherein the long fiber in the sheath part and the short fiber in the core part are intertangled,
(14) the fishing line according to any of the above (1) to (13), which has a history of a drawing treatment under heating or without heating in a production process of the composite yarn,
(15) the fishing line according to any of the above (1) to (14), wherein the long fiber comprises an ultra high molecular weight polyethylene fiber and the short fiber comprises a fluororesin fiber,
(16) the fishing line according to any of the above (1) to (15), wherein the adhesive resin is a hot melt adhesive,
(17) the fishing line according to any of the above (1) to (16), wherein the adhesive resin is a polyolefin copolymer, a polyester copolymer, or a polyamide copolymer,
(18) the fishing line according to the above (16) or (17), wherein the hot melt adhesive is a reactive hot melt adhesive,
(19) the fishing line according to any of the above (1) to (18), wherein the adhesive resin comprises a polyolefin resin and a polyurethane resin of which the glass transition point is 30° C. or higher,
(20) the fishing line according to the above (19), wherein the polyolefin resin is a modified polyolefin resin comprising (A1) an unsaturated carboxylic acid or an anhydride thereof, (A2) an olefin hydrocarbon, and (A3) at least one compound selected from the group consisting of an acrylate ester, a maleate ester, a vinyl ester, and acrylamide,
(21) the fishing line according to any of the above (1) to (20), wherein the adhesive resin contains metal particles,
(22) the fishing line according to any of the above (1) to (21), wherein two or more core yarns or two or more sheath yarns are paralleled, twisted, or braided, and
(23) the fishing line according to any of the above (1) to (22), wherein the outermost layer is coated with a resin.

Advantageous Effects of Invention

According to the present invention, it is possible to provide a fishing line which has a robust core-sheath structure which prevents substantial separation or detachment of the core part and the sheath part, and therefore prevents nude yarn or nep from being developed, and is resistant to kink, torsion, curliness in a reel, and thread jamming on a spool, achieving easy handling. It is also possible to provide a fishing line which has an outstanding tensile strength and has high weatherability and water resistance. Further, it is possible to provide a fishing line of high value and increased versatility, which has a high bendability and flexibility and a specific gravity adjustable in the range of 1.0 or more.

DESCRIPTION OF EMBODIMENTS

The fishing line of the present invention is a fishing line comprising a composite yarn having a core-sheath structure, the composite yarn comprising a core part having a core yarn containing a short fiber and a sheath part having a sheath yarn containing a long fiber, the core yarn and the sheath yarn being integrated with use of an adhesive resin. First, the composite yarn constituting the fishing line will be described.

Preferable examples of the sheath yarn constituting the sheath part of the composite yarn include a filament yarn made of two or more of at least one kind of filaments selected from the group consisting of a monofilament, a multifilament, and a monomultifilament.

Examples of the synthetic fiber used for the sheath yarn constituting the sheath part of the composite yarn include fibers made of synthetic resins, such as polyolefin, polyamide, polyester, and polyacrylonitrile resins. The tensile strength of these synthetic fibers determined with a tensile strength tester, for example Strograph R tensile strength tester manufactured by Toyo Seiki Seisaku-Sho, Ltd., according to JIS L 1013 "testing methods for man-made filament yarns", is usually higher than 8.8 cN/dtex, preferably 17.6 cN/dtex or higher, more preferably 22.0 cN/dtex or higher, and most preferably 26.5 cN/dtex or higher. The sheath yarn comprising a synthetic fiber is preferably a monofilament having a fineness of about 11 to 3300 dtex, or a monomultifilament composed of two or more monofilaments, preferably about 3 to 50 paralleled monofilaments. Alternatively, the sheath yarn comprising a synthetic fiber is preferably a multifilament composed of two or more, preferably about 10 to 600 paralleled monofilaments. The sheath yarn comprising a synthetic fiber may be composed of a single fiber or two or more kinds of fibers.

The synthetic fiber is preferably a super strength fiber, and particularly preferably an ultra high strength fiber. Examples of the ultra high strength fiber include polyolefin fibers such as ultra high molecular weight polyethylene fibers having a molecular weight of 300,000 or more, preferably 500,000 or more, aromatic polyamide (aramid) fibers, heterocyclic high-function fibers, and all the aromatic polyester fibers. Inter alia, polyolefin fibers such as ultra high molecular weight polyethylene fibers having a molecular weight of 500,000 or more are preferred. More preferred are ultra high molecular weight polyethylene fibers having a molecular weight of 1,000,000 or more. Examples thereof include, besides homopolymers, copolymers with a lower α-olefin having about 3 to 10 carbon atoms, such as propylene, butene, pentene, hexene, or the like. In the case of the copolymer of ethylene with the α-olefin, the ratio of the latter per 1000 carbon atoms is about 0.1 to 20, preferably about 0.5 to 10 on average. Copolymers having such a ratio show excellent mechanical properties, such as high strength. The method for producing ultra high molecular weight polyethylene is described in, for example, JP-A-55-5228 and JP-A-55-107506.

The synthetic fiber may comprise an ultra high strength fiber and a synthetic fiber other than ultra high strength fibers. The content of the synthetic fiber other than ultra high strength fibers relative to the ultra high strength fiber is ½ or less, preferably ⅓ or less, more preferably ¼ or less by weight.

The ultra high strength fiber used for the composite yarn may be a heterocyclic high-function fiber in which the amide bond of the above-mentioned aramid fiber is modified to increase elasticity of the aramid fiber. Examples of the heterocyclic high-function fiber include fibers made of poly-p-phenylene benzobisthiazole (PBZT), poly-p-phenylene benzobisoxazole (PBO), or the like. The heterocyclic high-function fiber can be produced by synthesizing PBZT or PBO resin, dissolving the obtained resin in a suitable solvent, and subsequent dry spinning and drawing. Examples of the solvent include anisotropic liquids, such as methylsulfonic acid, dimethylacetamide-LiCl, and the like.

As the sheath yarn constituting the sheath part of the composite yarn, two or more monofilaments, multifilaments, or monomultifilaments are used in a paralleled or twisted form. In the case of a twisted yarn, the twist coefficient K is 0.2 to 1.5, preferably 0.3 to 1.2, and more preferably 0.4 to 0.8.

The sheath part of the composite yarn usually has a structure in which a yarn made of two or more sheath yarns paralleled or twisted is braided or wound around the core part. In the case of a braided yarn, the braiding angle is preferably 5° to 90°, more preferably 5° to 50°, and more preferably 20° to 30°.

The short fiber contained in the core yarn constituting the core part of the composite yarn is a short fiber having a fiber length of 5 to 500 mm, preferably 10 to 300 mm, and more preferably a short fiber (staple) having a fiber length of 15 to 200 mm.

The short fiber contained in the core yarn constituting the core part of the composite yarn preferably has a specific gravity of 1.0 or more. The long fiber contained in the sheath yarn constituting the sheath part of the composite yarn is preferably an ultra high molecular weight polyethylene having a specific gravity of 0.98 and a molecular weight of 500,000 or more. When a fiber of which the specific gravity is less than 1.0 is used for the sheath part, using a short fiber of which the specific gravity is 1.0 or more for the core part enables adjustment of the specific gravity of the composite yarn without limitation to the specific gravity of the material constituting the sheath part. Such a composite yarn is advantageous because the specific gravity of a fishing line can be finely adjusted depending on the weather or tide.

The short fiber is produced by, for example, cutting a long fiber into pieces of a predetermined length. Also, the short fiber can be produced by various methods: cutting a filament into staples of a predetermined length, twisting staples to form a spun yarn and drawing the yarn to obtain irregularly broken fiber pieces, drawing a filament yarn, such as a multifilament and a monomultifilament to obtain irregularly broken fiber pieces, or the like.

It is more preferred that the core yarn which constitutes the core part is made of two or more single yarns and that the yarns are arranged in a staple-like form, sequentially arranged in a longitudinal direction, intertangled or intertwisted inside the sheath part of the composite yarn. Inter alia, preferred is a fishing line of which the single yarns of the short fiber form a cotton-like material inside the sheath part. Such a composite yarn is excellent in flexibility. The short fiber is preferably continuous inside the sheath part.

The short fiber contained in the core yarn constituting the core part of the composite yarn comprises at least one fiber selected from a fiber made of a synthetic resin, such as a polyolefin polymer (for example, polyethylene or polypropylene), a polyamide polymer (for example, nylon 6 or nylon 66), a polyester polymer (for example, polyethylene terephthalate), polytetrafluoroethylene, a fluororesin polymer, a polyacrylonitrile polymer, or a polyvinyl alcohol polymer; a regenerated fiber, such as rayon and acetate; a metal fiber, such as iron, copper, zinc, tin, nickel, and tungsten; a ceramic fiber; a glass fiber; and the like. Examples of the glass fiber include so-called E-glass excellent in electric and mechanical properties, C-glass excellent in chemical resistance, ECR-glass obtained by reducing the alkali content of C-glass and adding titanium and zinc flux thereto, and also A-glass, L-glass, S-glass, and YM31-A-glass. Inter alia, the glass fiber preferably used in the composite yarn constituting the fishing line of the present invention is a glass free from boron oxide and fluorine, and has a composition represented by $SiO_2$—$TiO_2$—$Al_2O_3$—RO (R is a divalent metal, such as Ca and Mg) or $SiO_2$—$Al_2O_3$—RO (R is the same as above).

Examples of the above-mentioned fluororesin polymer, which usually means a fiber obtained from a resin having a fluorine atom in the molecule, include polytetrafluoroethylene (PTFE), the copolymer of ethylene tetrafluoride and perfluoroalkyl vinyl ether (PFA), the copolymer of tetrafluoroethylene and hexafluoropropylene (FEP), the copolymer of ethylene and tetrafluoroethylene (ETFE), polychlorotrifluoroethylene (PCTFE), polychlorotrifluoroethylene (PCTFE), polyvinylidene fluoride (PVDF), and polyvinyl fluoride (PVF).

The strength of the short fiber is preferably 4.4 cN/dtex or less. The single-yarn fineness of the short fiber is preferably 11 dtex or less.

In the composite yarn constituting the fishing line of the present invention, short fibers contained in the core yarn constituting the core part may be independent, or loosely bound and intertangled or intertwisted. The short fiber is preferably obtained by breaking a long fiber or a spun yarn.

The composite yarn constituting the fishing line of the present invention comprises a core part having a core yarn containing a short fiber and a sheath part having a sheath yarn containing a long fiber, and preferably has a structure where fluff of the short fibers contained in the core yarn constituting the core part gets between or entangled with the long fibers contained in the sheath yarn constituting the sheath part and thereby the friction coefficient between the core and sheath layers is increased. In addition, in the composite yarn, it is preferred that the short fiber contained in the core yarn constituting the core part is intertangled with or enveloped by the long fiber contained in the sheath yarn constituting the sheath part, via the fluff of the short fiber. The short fiber in the core part may be bound with use of a binder to the extent that the objective of the present invention would not be impaired. By this treatment, the fluff condition of the short fiber can be adjusted, and a composite yarn with a smooth surface can be obtained. Publicly known binders may be used for convenience.

The fishing line of the present invention is a fishing line comprising a core yarn and a sheath yarn integrated with use of an adhesive resin as described above. Integrating the core yarn and the sheath yarn with use of an adhesive resin contributes to keeping the elongation rate of the yarn low and to improving the water resistance and weatherability in addition to the strong abrasion resistance.

The adhesive resin used for the fishing line of the present invention is not particularly limited as long as it is capable of integrating a core yarn and a sheath yarn, and any publicly known adhesive resin can be used. Examples of the known adhesive resins include an acrylic resin, an urethane resin, an unsaturated polyester resin, an epoxy resin, a fluororesin, a vinyl acetate resin, and a polyolefin resin.

The adhesive resin used for the fishing line of the present invention is preferably a polyolefin copolymer, a polyester copolymer, or a polyamide copolymer. Among them, preferred is a polyolefin resin made of a polyolefin copolymer mainly containing polyethylene, polypropylene, or the like, the polyolefin resin being a soft resin that can be softened when heated at about 50° C. for about 10 seconds. In addition, a heat adhesive resin, such as a polyolefin resin having a melting point of about 100° C. and exhibiting low viscosity in its molten state is also preferred. Such a polyolefin resin easily goes into a fluidized state when heated for only a short period of time, and can rapidly diffuse not only across the surface of a composite yarn but also penetrate into the center thereof, and therefore can exert an excellent adhesive function.

The adhesive resin used for the fishing line of the present invention is preferably a hot melt adhesive. A hot melt adhesive is a 100% solid, thermoplastic-polymer-based adhesive which is applied after being melted for lower viscosity and, as it cools, becomes solidified, exerting adhesive power. The hot melt adhesive used for the fishing line of the present invention is not particularly limited as long as it is similar to the ones mentioned above, and publicly known hot melt adhesives may be used. A hot melt adhesive which is not melted below about 100° C. after once hardened is preferably used. Such a hot melt adhesive does not melt or leak out during transportation or storage of the fishing line, and therefore solidification of the fishing line in a state wound on a spool, for example, can be prevented. The melting point of the hot melt adhesive is preferably lower than that of the constituent fibers of the composite yarn.

Examples of the hot melt adhesive used for the fishing line of the present invention include, for example, depending the type of the base polymer, ethylene-vinyl acetate copolymer (EVA) adhesives, polyethylene adhesives, polyolefin adhesives, thermoplastic rubber adhesives, ethylene-ethyl acrylate copolymer (EEA) adhesives, polyvinyl acetate copolymer adhesives, polycarbonate (PC) adhesives, and the like. Inter alia, polyethylene adhesives or polyolefin adhesives are preferred.

The hot melt adhesive used for the fishing line of the present invention is preferably a reactive hot melt adhesive. In a reactive hot melt adhesive, crosslinking reaction occurs after adhesion and thereby heat resistance is improved. To be more specific, in a case where a reactive hot melt adhesive melted at a relatively low temperature is applied to two or more composite yarns or where two or more composite yarns are impregnated with such a melted hot melt adhesive, after once hardened, the adhesive will not melt again at a low temperature, specifically at a temperature not higher than about 100° C. Therefore, the use of a reactive hot melt adhesive minimizes the possibility that the hot melt adhesive will melt during transportation or storage of the fishing line.

The reactive hot melt adhesive is not particularly limited, and any reactive hot melt adhesive known in the art may be used. Inter alia, preferred is a reactive hot melt adhesive that can be melted for application at a relatively low temperature, specifically about 60 to 130° C., and more preferably at about 70 to 100° C.

Specific examples of the above-mentioned reactive hot melt adhesive can be classified as follows, depending on the type of the crosslinking reaction: for example, (a) an ion crosslinking hot melt adhesive in which crosslinking reaction is caused by carboxyl groups and polyvalent metal ions in a polymer; (b) a thermal crosslinking hot melt adhesive to be hardened by heating after adhesion; (c) a hot melt adhesive containing block copolymers or polyesters having double bonds where crosslinking reaction is caused by irradiation of high energy beams, such as electron beams and ultraviolet rays; (d) a moisture curing hot melt adhesive in which crosslinking is caused by reaction with moisture in the air or in an adherend after the adhesive is melted and applied; and (e) a hot melt adhesive in which crosslinking structure is formed by separately melting a polymer having various functional groups and an additive or polymer that reacts with the functional groups, and mixing and reacting these two melted materials immediately before application.

The reactive hot melt adhesive used for the fishing line of the present invention is preferably a thermal crosslinking hot melt adhesive or a moisture curing hot melt adhesive, and particularly preferably a moisture curing hot melt adhesive.

Specific examples of the thermal crosslinking hot melt adhesive include a hot melt adhesive comprising blocked isocyanate obtained by blocking (a) a terminal carboxyl group or an amino group of polyester or copolyamide, or (b) an isocyanate group introduced into a molecular terminus or a side chain with use of a blocking agent such as caprolactam and phenol.

Specific examples of the moisture curing hot melt adhesive include a hot melt adhesive where an alkoxy group is introduced into a polymer, a hot melt adhesive where an isocyanate group is introduced into a polymer, and the like.

In addition, adhesive resin filaments may be used as part of two or more core yarns or two or more sheath yarns.

When an ultra high molecular weight polyethylene is used in the sheath part, the adhesive resin used for the fishing line of the present invention is preferably a resin comprising a polyolefin resin and a polyurethane resin of which the glass transition point is 30° C. or higher. In the resin comprising a polyolefin resin and a polyurethane resin of which the glass transition point is 30° C. or higher, the mass ratio of the polyolefin resin (A) to the polyurethane resin (B) of which the glass transition point is 30° C. or higher in the range of 97/3 to 10/90 is satisfactory. In terms of properties such as blocking resistance, adhesion and convergence to ultra high molecular weight polyethylene filaments, and the like, the ratio is preferably 95/5 to 20/80, more preferably 90/10 to 30/70, still more preferably 90/10 to 40/60, and particularly preferably 85/15 to 50/50. When the (A) content is more than 97% by mass, the blocking resistance is only poorly improved, and when the (A) content is less than 10% by mass, the adhesion and the convergence to ultra high molecular weight polyethylene filaments is extremely low.

Polyolefin Resin (A)

The polyolefin resin (A) used for the present invention is preferably a modified polyolefin resin comprising (A1) an unsaturated carboxylic acid or an anhydride thereof, (A2) an olefin hydrocarbon, and (A3) at least one compound selected from the group consisting of an acrylate ester, a maleate ester, a vinyl ester, and acrylamide. More preferred polyolefin resins satisfy the following formulae (1) and (2).

$$0.01 <= (A1)/\{(A1)+(A2)+(A3)\} \times 100 < 5 \qquad (1)$$

$$(A2)/(A3) = 55/45 \text{ to } 99/1 \qquad (2)$$

The (A1) content in the polyolefin resin (A) is preferably not less than 0.01% by mass and less than 5% by mass, more preferably not less than 0.1% by mass and less than 5% by mass, still more preferably not less than 0.5% by mass and less than 5% by mass, and most preferably 1 to 4% by mass. If the (A1) content is less than 0.01% by mass, mixing performance with polyurethane resin (B) is poor. Meanwhile, if the (A1) content is more than 5% by mass, the polarity of the polyolefin resin (A) is high, and the adhesion and convergence to ultra high molecular weight polyethylene filaments are prone to decline. Examples of the component (A1) include (meth)acrylic acid, maleic acid, itaconic acid, fumaric acid, and crotonic acid. The unsaturated carboxylic acid may be in the form of a derivative, such as a salt, an acid anhydride, a half ester, and a half amide. Inter alia, acrylic acid, methacrylic acid, and maleic acid (anhydrous) are preferred, and acrylic acid and maleic anhydride are particularly preferred. The type of copolymerization of the component is not particularly limited, and may be any of random copolymerization, block copolymerization, and graft copolymerization.

The mass ratio of the component (A2) to the component (A3), that is (A2)/(A3), is preferably in the range of 55/45 to 99/1. For favorable adhesion and convergence to ultra high molecular weight polyethylene filaments, the ratio is more preferably in the range of 60/40 to 97/3, still more preferably 65/35 to 95/5, particularly preferably 70/30 to 92/8, and most preferably 75/25 to 90/10. If the (A3) content is less than 1% by mass, mixing performance with polyurethane resin (B) may be poor. Meanwhile, if the content of the compound (A3) is more than 45% by mass, the properties of the resin of olefin origin is lost, resulting in decline in the adhesion and convergence to ultra high molecular weight polyethylene filaments.

Examples of the component (A2) include olefins having 2 to 6 carbon atoms, such as ethylene, propylene, isobutylene, 1-butene, 1-pentene, and 1-hexene, and a mixture thereof. Inter alia, olefins having 2 to 4 carbon atoms, such as ethylene, propylene, isobutylene, and 1-butene, are more preferred, and ethylene is particularly preferred.

Examples of the component (A3) include (meth)acrylate esters, such as methyl (meth)acrylate, ethyl (meth)acrylate, and butyl (meth)acrylate; maleate esters, such as dimethyl maleate, diethyl maleate, and dibutyl maleate; vinyl esters, such as vinyl formate, vinyl acetate, vinyl propionate, vinyl pivalate, and vinyl versate; acrylamides, such as acrylamide and dimethyl acrylamide; and a mixture thereof. Inter alia, (meth)acrylate esters are more preferred, methyl (meth) acrylate and ethyl (meth)acrylate are particularly preferred, and methyl acrylate and ethyl acrylate are most preferred. Herein, "(meth)acrylate" means "acrylate or methacrylate".

The most preferred specific examples of polyolefin resin (A) having the above constitution include ethylene-methyl acrylate-maleic anhydride terpolymer and ethylene-ethyl acrylate-maleic anhydride terpolymer. The type of the terpolymer may be any of random copolymerization, block copolymerization, and graft copolymerization, but in view of availability, a random copolymer and a graft copolymer are preferred.

While a resin is hydrophilized, hydrolysis of only a few ester bonds may occur, converting some acrylic ester units into acrylic acid units. In such cases, the ratio of each component with consideration of the conversion should be within each predetermined range.

As for the polyolefin resin (A) used for the present invention, the maleic acid unit in the polyolefin resin containing maleic anhydride units tends to, in the dry state, have the maleic anhydride structure in which the adjacent carboxyl groups are cyclodehydrated, whereas in an aqueous medium containing a basic compound described later, a part or the whole of the ring is opened, and the maleic acid unit tends to have the structure of maleic acid or a salt thereof.

The polyolefin resin (A) used for the present invention has a melt flow rate, a measure of molecular weight, of 0.01 to 500 g/10 min, preferably 1 to 400 g/10 min, more preferably 2 to 300 g/10 min, and most preferably 2 to 250 g/10 min at 190° C. under a load of 2,160 g. If the melt flow rate of the polyolefin resin (A) is less than 0.01 g/10 min, mixing performance with polyurethane resin (B) may be poor. Meanwhile, if the melt flow rate of the polyolefin resin (A) is more than 500 g/10 min, the resin is hard and brittle, and the adhesion and convergence to ultra high molecular weight polyethylene filaments decline.

The synthetic method of the polyolefin resin (A) is not particularly limited. Generally, the polyolefin resin (A) can be obtained by high-pressure radical copolymerization of the constituent monomers in the presence of a radical-generating agent. The unsaturated carboxylic acid or an anhydride thereof may be graft-copolymerized (graft-modified).

Polyurethane Resin (B)

The polyurethane resin used for the present invention (B) is a polymer having a urethane bond in the main chain, for example, a polymer that can be obtained by reaction of a polyol compound with a polyisocyanate compound. In the present invention, the structure of the polyurethane resin (B) is not particularly limited, but from the viewpoint of blocking resistance, the glass transition temperature must be 30° C. or higher. From the viewpoint of improvement in blocking resistance and the reliability of original thread, the glass transition temperature is preferably 50° C. or higher, and particularly preferably 60° C. or higher.

The polyurethane resin (B) of the present invention preferably has an anionic group from the viewpoint of mixing performance with polyolefin resin (A). An anionic group is a functional group that becomes an anion in an aqueous medium, for example, a carboxyl group, a sulfonic group, a sulfate group, a phosphate group, or the like. Among them, a carboxyl group is preferred.

The polyol component of the polyurethane resin (B) is not particularly limited, and examples thereof include water; low-molecular-weight glycols, such as ethylene glycol, diethylene glycol, triethylene glycol, 1,3-butanediol, 1,4-butanediol, 1,2-propanediol, 1,3-propanediol, 1,6-hexanediol, neopentyl glycol, 1,4-cyclohexane dimethanol, methyl-1,5-pentanediol, 1,8-octanediol, 2-ethyl-1,3-hexandiol, diethylene glycol, triethylene glycol, and dipropylene glycol; low-molecular-weight polyols, such as trimethylolpropane, glycerol, and pentaerythritol; polyol compounds having an ethylene oxide unit or a propylene oxide unit; high-molecular-weight diols, such as polyether diols and polyester diols; bisphenols, such as bisphenol A and bisphenol F; dimer diols resulting from conversion of carboxyl groups in a dimer acid into hydroxyl groups; and the like.

As the polyisocyanate component, one kind of, or a mixture of two or more kinds of publicly known aromatic, aliphatic, or alicyclic diisocyanates can be used. Specific examples of the diisocyanates include tolylene diisocyanate, 4,4'-diphenylmethane diisocyanate, 1,3-phenylene diisocyanate, hexamethylene diisocyanate, xylylene diisocyanate, 1,5-naphthylene diisocyanate, isophorone diisocyanate, dimethyl diisocyanate, lysine diisocyanate, hydrogenated 4,4'-diphenylmethane diisocyanate, hydrogenated tolylene diisocyanate, dimer diisocyanate resulting from conversion of carboxyl groups in a dimer acid into isocyanate groups; adducts, biurets, and isocyanurates thereof; and the like. The diisocyanates may be polyisocyanates having three or more functional groups, such as triphenylmethane triisocyanate and polymethylene polyphenyl isocyanate.

In order to introduce an anionic group into the polyurethane resin (B), a polyol component having a carboxyl group, a sulfonic group, a sulfate group, a phosphate group, or the like may be used. Examples of the polyol compound having a carboxyl group include 3,5-dihydroxybenzoic acid, 2,2-bis(hydroxymethyl) propionic acid, 2,2-bis(hydroxyethyl)propionic) propionic acid, 2,2-bis(hydroxypropyl) propionic acid, bis(hydroxymethyl)acetic acid, bis(4-hydroxyphenyl)acetic acid, 2,2-bis(4-hydroxyphenyl)pentanoic acid, tartaric acid, N,N-dihydroxyethyl glycine, and N,N-bis(2-hydroxyethyl)-3-carboxyl propionamide.

The molecular weight of the polyurethane resin (B) can also be suitably adjusted with use of a chain extender. Examples of such a compound include a compound having two or more active hydrogen atoms, which are contained in, for example, in amino groups and hydroxyl groups, capable of reacting with an isocyanate group; as such a compound, diamine compounds, dihydrazide compounds, and glycols can be used, for example.

Examples of the diamine compound include ethylenediamine, propylenediamine, hexamethylenediamine, triethyl tetramine, diethylenetriamine, isophoronediamine, and dicyclohexylmethane-4,4'-diamine. In addition, hydroxyl-group-containing diamines, such as N-2-hydroxyethyl ethylenediamine and N-3-hydroxypropyl ethylenediamine; dimer diamines resulting from conversion of carboxyl groups in a dimer acid into amino groups; and the like are included. Further, diamine-type amino acids, such as glutamic acid, asparagine, lysine, diaminopropionic acid, ornithine, diaminobenzoic acid, and diaminobenzene sulfonic acid are also included.

Examples of the dihydrazide compound include saturated aliphatic dihydrazides having 2 to 18 carbon atoms, such as oxalic acid dihydrazide, malonic acid dihydrazide, succinic acid dihydrazide, glutaric acid dihydrazide, adipic acid dihydrazide, and sebacic acid dihydrazide; unsaturated dihydrazides, such as maleic acid dihydrazide, fumaric acid dihydrazide, itaconic acid dihydrazide, and phthalic acid dihydrazide; carbonic dihydrazide; carbodihydrazide; thiocarbodihydrazide; and the like.

The glycol for use can be suitably selected from the above-mentioned polyols.

In the present invention, the method for applying the above-described resin comprising the polyolefin resin (A) and the polyurethane resin (B) of which the glass transition point is 30° C. or higher is not particularly limited. Examples of the method include a method in which the resin is heated to a temperature higher than the melting point and then directly applied, dissolved in a solvent and applied, or applied as an aqueous dispersion. Most preferred is, in the viewpoints of the adjustment of the amount to be applied, and environmental effects, the method of applying an aqueous dispersion.

For film performance (in particular water resistance) and hygienic reasons, it is preferred that the aqueous dispersion is substantially free from nonvolatile hydrophilizing agent. This is because such a compound remains in a film even after film formation, and leaks from the film or plasticizes the film, deteriorating the performance of the film.

The "hydrophilizing agent" means an agent added in production of the aqueous dispersion for the purpose of facilitating hydrophilization and stabilizing the aqueous dispersion. The "nonvolatile" means having no boiling point under ordinary pressure, or having a high boiling point (for example, not less than 300° C.) under ordinary pressure. The "substantially free from nonvolatile hydrophilizing agent" means that since no nonvolatile hydrophilizing agent is positively added, the resulting aqueous dispersion does not contain the agent. Particularly preferred is that no nonvolatile hydrophilizing agent is added, but addition of a nonvolatile hydrophilizing agent is allowable as long as the content is less than 0.1% by mass relative to the resin and the addition does not impair the effect of the present invention.

Examples of the nonvolatile hydrophilizing agent include, emulsifiers, compounds having a protective colloid action, modified waxes, acid-modified compounds having a high acid number, water soluble polymers, and the like, which will be described below.

Examples of the emulsifier include cationic emulsifiers, anionic emulsifiers, nonionic emulsifiers, and amphoteric emulsifiers. In addition to general emulsifiers used for emulsion polymerization, surfactants are also included. Examples of the anionic emulsifier include sulfates of higher alcohols, higher alkyl sulfonates, higher carboxylates, alkylbenzene sulfonates, polyoxyethylene alkyl sulfates, polyoxyethylene alkylphenyl ether sulfates, and vinyl sulfosuccinates. Examples of the nonionic emulsifier include compounds having a polyoxyethylene structure, such as polyoxyethylene alkyl ethers, polyoxyethylene alkylphenyl ethers, polyethylene glycol fatty acid esters, ethylene oxide-propylene oxide block copolymers, polyoxyethylene fatty acid amides, and ethylene oxide-propylene oxide copolymers; and sorbitan derivatives, such as polyoxyethylene sorbitan fatty acid esters. Examples of the amphoteric emulsifier include lauryl betaine, and lauryldimethylamine oxide.

Examples of the compounds having a protective colloid action, modified waxes, acid-modified compounds having a high acid number, and water soluble polymers include compounds usually used as dispersion stabilizer of fine particles. Such compounds include polyvinyl alcohol, carboxyl-modified polyvinyl alcohol, carboxymethyl cellulose, hydroxyethyl cellulose, hydroxypropylcellulose, modified starch, polyvinyl pyrrolidone, polyacrylic acid, and salts thereof; acid-modified polyolefin waxes of which the number mean molecular weight is usually not more than 5,000, such as carboxyl group-containing polyethylene waxes, carboxyl group-containing propylene waxes, carboxyl group-containing polyethylene-propylene waxes, and salts thereof; acrylic acid-maleic anhydride copolymers and salts thereof; carboxyl group-containing polymers having 10% by mass or more of unsaturated carboxylic acid, such as styrene (meth) acrylic acid copolymers, ethylene-(meth)acrylic acid copolymers, isobutylene-maleic anhydride alternating copolymers, and (meth)acrylic acid-(meth)acrylic acid ester copolymers, and salts thereof; polyitaconic acid and salts thereof; water-soluble acrylic copolymers; gelatin; gum arabic; casein; and the like.

In the aqueous dispersion, it is preferred that carboxyl groups (including acid anhydrides) of the polyolefin resin (A), and anionic groups of the polyurethane resin (B) are partially anionized. The electrostatic repulsive force of the anions prevents resin particles from aggregating and stabilizes the aqueous dispersion.

Method for Producing Aqueous Dispersion

The aqueous dispersion of the present invention may be obtained by hydrophilizing the polyolefin resin (A) and the polyurethane resin (B) as a mixture at the same time in a container, or by mixing an aqueous dispersion of the polyolefin resin (A) and an aqueous dispersion of the polyurethane resin (B) at a desired ratio. The latter method is preferred. Hereafter, this preferred method will be explained in detail.

Aqueous Dispersion of Polyolefin Resin (A)

The method for obtaining the aqueous dispersion of the polyolefin resin (A) is not particularly limited, and as the method, heating and stirring the polyolefin resin (A) and an aqueous medium in a well-closable container may be adopted. The shape of the resin to be hydrophilized is not particularly limited, but for rapid hydrophilization, preferred is a granular or powder resin having a particle diameter of 1 cm or less, preferably 0.8 cm or less.

The container may be any container as long as the container has a tank to which a liquid can be introduced and enables a mixture of the introduced aqueous medium and the resin to be appropriately stirred. For this purpose, apparatuses, such as a solid/liquid mixer and an emulsifier widely known by those skilled in the art may be used, and an apparatus which can apply a pressure of 0.1 MPa or higher is preferably used. The stirring method and the rotational speed of the stirring are not particularly limited.

After each introduced into the tank of the apparatus, the raw materials are mixed with stirring preferably at a temperature not higher than 40° C. Next, while the temperature of the tank is kept at 50 to 200° C., preferably 60 to 200° C., stirring is continued for preferably 5 to 120 minutes so that the resin can be sufficiently hydrophilized. By cooling the hydrophilized resin to a temperature not higher than 40° C. preferably with stirring, an aqueous dispersion can be obtained. When the temperature in the tank is less than 50° C., hydrophilization of the resin is difficult. When the temperature in the tank is higher than 200° C., the molecular weight of the polyolefin resin (A) may decrease.

At this time, for the reason described above, a basic compound is preferably added in order to anionize the carboxyl groups or the acid anhydride groups of the polyolefin resin (A). The amount of the basic compound to be added is, relative to the carboxyl group (1 mol of acid anhydride group is regarded as 2 mol of carboxyl group) in the polyolefin resin (A), preferably 0.5 to 3.0 times equivalent, more preferably 0.8 to 2.5 times equivalent, and particularly preferably 1.0 to 2.0 times equivalent. Less than 0.5 times equivalent of the basic compound does not show any effect, and more than 3.0 times equivalent may prolong the drying time in film formation and may color the aqueous dispersion.

Preferred examples of the basic compound to be added include metal hydroxides, such as LiOH, KOH, and NaOH. From the viewpoint of water resistance of the film, preferred are compounds which volatilize during film formation, such as ammonia and various kinds of organic amine compounds. The boiling point of such an organic amine compound is preferably not higher than 250° C. If the boiling point is higher than 250° C., the organic amine compound hardly volatilizes while the resin film is drying, and the water resistance of the film may deteriorate. The examples of the organic amine compound include triethylamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, methyliminobispropylamine, 3-methoxypropylamine, monoethanolamine, diethanolamine, triethanolamine, morpholine, N-methylmorpholine, N-ethylmorpholine, and the like.

In the hydrophilization of the polyolefin resin (A), it is preferred to add an organic solvent. The amount of the organic solvent to be added is, relative to 100 parts by mass of the aqueous dispersion, preferably 1 to 40 parts by mass, more preferably 2 to 30 parts by mass, and particularly preferably 3 to 20 parts by mass. The organic solvent can be partially removed from the system by heating of the aqueous dispersion with stirring under ordinary pressure or reduced pressure (stripping), and thereby be finally reduced to such a level that the ratio is not more than 1 part by mass relative to 100 parts by mass of the aqueous dispersion of the polyolefin resin (A). Specific examples of the organic solvent to be used include ethanol, n-propanol, isopropanol, n-butanol, methylethylketone, cyclohexanone, tetrahydrofuran, dioxane, ethyleneglycolmonoethylether, ethyleneglycolmonopropylether, and ethyleneglycolmonobutylether. From the viewpoint of low-temperature drying property, isopropanol is particularly preferred.

Aqueous Dispersion of Polyurethane Resin (B)

The method for obtaining the aqueous dispersion of the polyurethane resin (B) is not particularly limited. The polyurethane resin (B) can be dispersed in an aqueous medium according to the hydrophilization method for the polyolefin resin (A) described above. Such aqueous dispersions of the polyurethane resin (B) are commercially available, and examples thereof include anionic products, such as Takerack W-615, W-6010, W-6020, W-6061, W-511, W-405, W-7004, W-605, WS-7000, WS-5000, WS-5100, and WS-4000; and nonionic products, such as Takerack W-512A6 and W-635, manufactured by Mitsui Takeda Chemicals Inc.

By mixing the above-mentioned aqueous dispersion of the polyolefin resin (A) and aqueous dispersion of the polyurethane resin (B), an aqueous dispersion having a desired resin ratio can be obtained.

From the viewpoint of improvement in the preservation stability of the aqueous dispersion, the number mean particle diameter (hereinafter, m) of the resin particles in the aqueous dispersion is preferably not more than 0.3 µm, and from the viewpoint of low-temperature film formability, more preferably not more than 0.2 µm, and most preferably less than 0.1 µm. The weight mean particle diameter (hereinafter, mw) is preferably not more than 0.3 µm, more preferably not more than 0.2 µm. Reducing the particle diameter improves the film formability at a low temperature (for example, not higher than 100° C., or not higher than the melting point of the polyolefin resin (A)), enabling the formation of a transparent film. From the viewpoints of the preservation stability and the low-temperature film formability of the aqueous dispersion, the degree of particle dispersion (mw/mn) is preferably 1 to 3, more preferably 1 to 2.5, and particularly preferably 1 to 2.

The resin content of the aqueous dispersion can be suitably selected depending on the film-forming conditions, targeted thickness or performance of the resin film, and the like, and is not particularly limited. However, for appropriate viscosity and favorable film formability of the coating composition, the resin content is preferably 1 to 60% by mass, more preferably 3 to 55% by mass, further preferably 5 to 50% by mass, and particularly preferably 5 to 45% by mass.

In order to further improve various kinds of film performances, such as water resistance and solvent resistance, a crosslinking agent can be added in an amount of 0.01 to 60 parts by mass, preferably 0.1 to 30 parts by mass relative to 100 parts by mass of the total of the polyolefin resin (A) and the polyurethane resin (B) in the aqueous dispersion. As for the crosslinking agent, less than 0.01 part by mass does not sufficiently improve the film performance, and more than 100 parts by mass deteriorates the performance, for example, workability. Examples of the crosslinking agent include self-crosslinking agents, compounds which have in a molecule two or more functional groups capable of reacting with carboxyl groups, and metals which have multiple coordination sites, and among these, preferred are isocyanate compounds, melamine compounds, urea compounds, epoxy compounds, carbodiimide compounds, oxazoline-group-containing compounds, zirconium salt compounds, silane coupling agents, and the like. These crosslinking agents may be used in combination.

In addition, various kinds of agents, such as a leveling agent, a defoaming agent, an antipopping agent, a pigment dispersing agent, and an ultraviolet ray absorbing agent; and pigments or dyes, such as titanium oxide, zinc oxide, and carbon black, may be added to the aqueous dispersion as needed.

The resin comprising a polyolefin resin (A) and a polyurethane resin (B) of which the glass transition point is 30° C. or higher is described in, for example, JP-A-2004-51661, and such a known method may be used. As the resin comprising a polyolefin resin (A) and a polyurethane resin (B) of which the glass transition point is 30° C. or higher, commercial products, such as Arrowbase (registered trademark, made by Unitika Ltd.) may be used.

The adhesive resin used for the fishing line of the present invention may contain metal particles. It is advantageous to produce a fishing line with use of the adhesive resin containing metal particles because the specific gravity of such a fishing line can be set at any desired value, especially at a higher value, regardless of the specific gravity of the adhesive resin. Examples of the metal particles include particles of lead, iron, stainless steel, aluminum, nickel, cobalt, chromium, manganese, molybdenum, cadmium, copper, zinc, tin, silver, gold, platinum, palladium, tungsten, titanium, and zirconium; alloys thereof; and oxides thereof. Among them, preferred is tungsten, because addition of even a small amount of tungsten effectively increases the specific gravity, with minimum strength reduction of the fishing line. The adhesive resin may contain one kind or two or more kinds of metal particles.

These metal particles can be used in the form of powder or granule in the present invention. The average diameter thereof is preferably not more than about 20 µm, more preferably not more than about 10 µm. When the particle diameter of the metal particles is too large, total uniformity after mixing is poor. The amount of the metal particles added to 100 parts by weight of the adhesive resin is preferably about 1 to 90 parts by weight, more preferably about 5 to 70 parts by weight. The adhesive resin containing metal particles can be made by, as a method, melt kneading of an adhesive resin and the metal particles with use of a monoaxial or biaxial kneading machine.

Next, a method for producing the composite yarn constituting the fishing line of the present invention will be described. The composite yarn can be produced with use of a sheath yarn comprising a long fiber for the sheath part and a core yarn comprising a short fiber for the core part, and preferably produced by, for example, the following method (I), (II), or (III).

(I) A production method comprising producing a composite yarn with use of a sheath yarn comprising a long fiber for the sheath part and another long fiber for the core yarn constituting the core part, the melting point of the long fiber for the core yarn constituting the core part being higher than that of the long fiber for the sheath yarn, and drawing the composite yarn under heating to break the long fiber in the core yarn into short fiber pieces without breaking the long fiber in the sheath yarn. (In this case, the strength of the long fiber for the core part is preferably lower than that of the long fiber for the sheath part.)

(II) A production method comprising producing a composite yarn with use of a sheath yarn comprising a long fiber for the sheath part and another long fiber for the core yarn constituting the core part, the strength of the long fiber for the core yarn constituting the core part being lower than that of the long fiber for the sheath part, and drawing the composite yarn under heating or without heating to break the long fiber in the core yarn into short fiber pieces without breaking the long fiber in the sheath yarn.

(III) A production method comprising producing a composite yarn with use of a sheath yarn comprising a long fiber for the sheath part and a spun yarn comprising a short fiber or staple for the core yarn constituting the core part, the melting point of the short fiber or staple being higher than that of the long fiber for the sheath part, and drawing the composite yarn under heating or without heating to break the spun yarn into short fiber pieces without breaking the long fiber in the sheath part.

The composite yarn is produced by winding sheath yarns comprising a long fiber around the core part constituted by a core yarn so that the sheath yarn covers the core yarn, or braiding sheath yarns comprising a long fiber around the core part constituted by a core yarn. The core yarn is a yarn comprising the above-mentioned long fiber or a spun yarn. In the case of a braided yarn, the braiding angle is preferably 5° to 90°, more preferably 5° to 50°, and more preferably 20° to 30°. The method for braiding sheath yarns is not particularly limited, but usually a braiding machine is used. The number of sheath yarns used for braiding is not limited to 4 and in some cases may be 8, 12, 16, or the like. The braiding may be round braiding or square braiding.

A composite yarn composed of a core part comprising a short fiber and a sheath part comprising a synthetic fiber filament yarn is drawn under heating or without heating, to give an integrated yarn where fluff of the short fiber is entangled with the filament (long fiber) so that the binding between the core and sheath layers is strengthened and that the strength of the long fiber of the sheath yarn constituting the sheath part is improved. Drawing under heating is preferred. As the drawing temperature, a temperature between the orientation temperature of the synthetic resin which constitutes the long fiber of the sheath yarn and about the melting point of the resin is adopted, depending on the material of the long fiber. When the sheath yarn is constituted by a long fiber comprising two or more kinds of synthetic resins, the drawing temperature is suitably selected by experiment. Therefore, the drawing temperature cannot be simply mentioned, but the temperature of the long fiber in drawing is usually about 120 to 300° C., more preferably 130 to 200° C., and most preferably 130 to 170° C. The drawing rate varies with the types of the short fiber and the long fiber, and the composition ratio in the composite yarn, but is 1.05 to 10, preferably 1.2 to 8, and most preferably 1.3 to 5. The drawing rate is the ratio of the take-over speed to the feed speed of the yarn in drawing as represented by the following formula:

$$\text{drawing rate} = (\text{take-over speed})/(\text{feed speed})$$

The drawing may be performed in one step or two or more steps. Before drawing a composite yarn, an oil agent is provided to the yarn. The method is not particularly limited, and publicly known methods may be employed.

When the composite yarn is composed of a core part having a core yarn made of a spun yarn and a sheath part having a sheath yarn made of a synthetic long fiber, drawing treatment increases the tensile strength of the filament constituting the sheath part and strengthens the entanglement between the core and sheath layers, giving a strong yarn excellent in abrasion resistance. In drawing a composite yarn of which the core part comprises a staple yarn, when a drawing rate is higher than a certain value as described above, the staple yarn in the core part is partially and irregularly broken to form a cotton-like material, giving a yarn excellent in bendability and flexibility.

Hereafter, the method for integrating a core yarn and a sheath yarn with use of an adhesive resin will be described.

In the method for producing the composite yarn constituting the fishing line of the present invention described in the above (I), (II), and (III), adopting the following method (i), (ii), (iii), or (iv) enables production of a composite yarn having a core yarn and a sheath yarn integrated with use of an adhesive resin.

(i) A composite yarn is produced by combining a core yarn and a sheath yarn, an adhesive resin is applied to the composite yarn or the composite yarn is impregnated with an adhesive resin, and the composite yarn is drawn under heating.
(ii) An adhesive resin is applied to a sheath yarn or a sheath yarn is impregnated with an adhesive resin, the sheath yarn is combined with a core yarn to produce a composite yarn, and the composite yarn is drawn under heating.
(iii) An adhesive resin is applied to a core yarn or a core yarn is impregnated with an adhesive resin, the core yarn is combined with a sheath yarn to produce a composite yarn, and the composite yarn is drawn under heating.
(iv) An adhesive resin is applied to each of the sheath yarn and the core yarn, or each of the sheath yarn and the core yarn is impregnated with an adhesive resin, a composite yarn is produced by combining the sheath yarn and the core yarn, and the composite yarn is drawn under heating.

Since excessive resin is squeezed out by the drawing, a procedure for wiping off the excessive resin may be added in the drawing step.

The core yarn and the sheath yarn may be ply yarns. The ply yarn may be produced by simply paralleling two or more core yarns or sheath yarns. The paralleled yarn may be additionally twisted if desired. Alternatively, two or more core yarns or two or more sheath yarns may be braided. The twisting can be easily performed with a publicly known twisting machine, and the braiding can be easily performed with a publicly known braiding machine.

The method for applying an adhesive resin to a core yarn, a sheath yarn, or a composite yarn, or impregnating a core yarn, a sheath yarn, or a composite yarn with an adhesive resin is not particularly limited, and publicly known methods may be employed. Specific examples of such a known method include dipping of one of the yarns with use of a melting apparatus followed by optional squeezing of excessive resin, application with use of spray etc., and extrusion coating with use of an extrusion coater. Alternatively, publicly known applicators may be used. Examples of such an applicator include an applicator having a nozzle gun head.

The outermost layer of the thus obtained fishing line of the present invention may be coated with a resin. Coating the outermost layer with a resin provides an advantage of smoothing the surface of the fishing line and further improving the strength, water absorption resistance, and abrasion resistance. Examples of the resin used for coating include synthetic resins, such as polypropylene, vinyl chloride, acrylic, urethane, nylon, polyester, epoxy, vinyl acetate and ethylene-vinyl acetate resins, and the synthetic resins may be of an emulsion type or a solvent type. In addition, natural rubber and synthetic rubber resin, such as SBR can also be used. Among them, polypropylene is preferably used. For the coating, publicly known methods may be preferably used, and examples thereof include melt extrusion coating, and the like.

In the fishing line of the present invention, the short fiber, the long fiber (filament), the adhesive resin, and the like may additionally contain a colorant, a stabilizer, a plasticizer, a thickener, a lubricant or the like, or two or more thereof, to the extent that the objective of the present invention would not be impaired.

EXAMPLES

Hereinafter, the present invention will be illustrated by Examples, but it is not limited thereto.

The tensile strength in the Examples was determined by a method according to JIS L 1013 "Testing methods for man-made filament yarns" with a Strograph R tensile strength tester manufactured by Toyo Seiki Seisaku-Sho, Ltd. The break elongation was determined by a method according to JIS L 1013 "Testing methods for man-made filament yarns" with a universal testing machine "Autograph AG-100kNI" (manufactured by Shimadzu Corporation). The fineness was determined according to JIS L 1013, Section 7.3. To judge the break status of the core yarn, the entire yarn was cut at right angle to the longitudinal direction, the core yarn was pulled out from a cut surface, and whether a short piece of the core yarn was obtained or not was observed. "Good" means that not the entire core yarn but short pieces of the core yarn were pulled out (from a cut surface) with some resistance, whereas "Poor" means that the entire core yarn was easily pulled out in an unbroken state and that the core and the sheath were easily separated.

Composite Yarn Production Example 1

An Adhesive Resin was Applied to Sheath Yarns Before Braiding Followed by Drawing Under Heating A 66-d spun yarn made of a polyester staple (trade name: Ester Spun Yarn E100FBN80/1C, manufactured by Unitika Fiber Co., Ltd.) was used as a core yarn.

A 75-d filament made of an ultra high molecular weight polyethylene fiber (trade name: Dyneema SK71 85T-70-410, manufactured by TOYOBO Co., Ltd.) was dipped in an aqueous dispersion prepared by diluting an adhesive resin comprising a polyolefin resin and a polyurethane resin of which the glass transition point is 30° C. or higher (Arrowbase SAW-1220, manufactured by Unitika Ltd.) with water at a dilution ratio of 1:1 by mass, and then dried. The obtained yarn was used as a sheath yarn.

Around a core yarn, eight sheath yarns were round braided. The obtained yarn was drawn at a drawing rate of 1.0, 1.3, 1.5, or 1.8 at a drawing temperature of 140° C. Excess resin was squeezed out in the drawing.

The fineness, straight line strength, straight line break elongation, knot strength, knot break elongation, and specific gravity of the obtained yarn; and the break status of the core yarn are shown in Table 1. As Table 1 clearly shows, at any drawing rate, the core yarn was broken.

TABLE 1

| Drawing rate | 1.0 | 1.3 | 1.5 | 1.8 |
|---|---|---|---|---|
| Fineness (dtex) | 894 | 689 | 593 | 496 |
| Break status | Good | Good | Good | Good |
| Straight line strength (N) | 193.01 | 187.75 | 158.70 | 113.60 |
| Straight line break elongation (%) | 6.9 | 5.2 | 3.8 | 3.3 |
| Knot strength (N) | 65.30 | 61.59 | 59.03 | 49.45 |
| Knot break elongation (%) | 3.2 | 3.0 | 2.2 | 1.8 |
| Specific gravity | 1.01 | 1.01 | 1.01 | 1.01 |

Composite Yarn Production Example 2

An Adhesive Resin was Applied to a Core Yarn Before Braiding Followed by Drawing Under Heating A 66-d spun yarn made of a polyester staple (trade name: Ester Spun Yarn E100FBN80/1C, manufactured by Unitika Fiber Co., Ltd.) was dipped in an aqueous dispersion prepared by diluting an adhesive resin comprising a polyolefin resin and a polyurethane resin of which the glass transition point is 30° C. or higher (Arrowbase SAW-1220, manufactured by Unitika Ltd.) with water at a dilution ratio of 1:1 by mass, and then dried. The obtained yarn was used as a core yarn.

A 75-d filament made of an ultra high molecular weight polyethylene fiber (trade name: Dyneema SK71 85T-70-410, manufactured by TOYOBO Co., Ltd.) was used as a sheath yarn.

Around a core yarn, eight sheath yarns were round braided. The obtained yarn was drawn at a drawing rate of 1.0, 1.3, 1.5, or 1.8 at a drawing temperature of 140° C. Excess resin was squeezed out in the drawing.

The fineness, straight line strength, straight line break elongation, knot strength, knot break elongation, and specific gravity of the obtained yarn; and the break status of the core yarn are shown in Table 2. As Table 2 clearly shows, at any drawing rate, the core yarn was broken.

TABLE 2

| Drawing rate | 1.0 | 1.3 | 1.5 | 1.8 |
|---|---|---|---|---|
| Fineness (dtex) | 821 | 632 | 544 | 454 |
| Break status | Good | Good | Good | Good |
| Straight line strength (N) | 189.84 | 187.83 | 159.24 | 113.98 |
| Straight line break elongation (%) | 6.7 | 5.0 | 3.6 | 3.2 |
| Knot strength (N) | 64.23 | 60.53 | 59.23 | 49.20 |
| Knot break elongation (%) | 3.2 | 2.9 | 2.4 | 1.8 |
| Specific gravity | 1.01 | 1.01 | 1.01 | 1.01 |

Composite Yarn Production Example 3

An Adhesive Resin was Applied to a Core Yarn and Sheath Yarns Before Braiding Followed by Drawing Under Heating A 66-d spun yarn made of a polyester staple (trade name: Ester Spun Yarn E100FBN80/1C, manufactured by Unitika Fiber Co., Ltd.) was dipped in an aqueous dispersion prepared by diluting an adhesive resin comprising a polyolefin resin and a polyurethane resin of which the glass transition point is 30° C. or higher (Arrowbase SAW-1220, manufactured by Unitika Ltd.) with water at a dilution ratio of 1:1 by mass, and then dried. The obtained yarn was used as a core yarn.

A 75-d filament made of an ultra high molecular weight polyethylene fiber (trade name: Dyneema SK71 85T-70-410, manufactured by TOYOBO Co., Ltd.) was dipped in an aqueous dispersion prepared by diluting an adhesive resin comprising a polyolefin resin and a polyurethane resin of which the glass transition point is 30° C. or higher (Arrowbase SAW-1220, manufactured by Unitika Ltd.) with water at a dilution ratio of 1:1 by mass, and then dried. The obtained yarn was used as a sheath yarn.

Around a core yarn, eight sheath yarns were round braided. The obtained yarn was drawn at a drawing rate of 1.0, 1.3, 1.5, or 1.8 at a drawing temperature of 140° C. Excess resin was squeezed out in the drawing.

The fineness, straight line strength, straight line break elongation, knot strength, knot break elongation, and specific gravity of the obtained yarn; and the break status of the core yarn are shown in Table 3. As Table 3 clearly shows, at any drawing rate, the core yarn was broken.

TABLE 3

| Drawing rate | 1.0 | 1.3 | 1.5 | 1.8 |
|---|---|---|---|---|
| Fineness (dtex) | 897 | 690 | 594 | 497 |
| Break status | Good | Good | Good | Good |
| Straight line strength (N) | 192.67 | 186.48 | 158.92 | 114.62 |
| Straight line break elongation (%) | 6.7 | 5.3 | 3.4 | 2.9 |
| Knot strength (N) | 65.42 | 62.61 | 59.82 | 49.63 |
| Knot break elongation (%) | 3.1 | 2.9 | 2.2 | 1.8 |
| Specific gravity | 1.01 | 1.01 | 1.01 | 1.01 |

Composite Yarn Production Example 4

An Adhesive Resin was Applied to a Braided Composite Yarn Before Drawing Under Heating Around a 66-d spun yarn made of a polyester staple (trade name: Ester Spun Yarn E100FBN80/1C, manufactured by Unitika Fiber Co., Ltd.) as a core yarn, eight 75-d filaments made of an ultra high molecular weight polyethylene fiber (trade name: Dyneema SK71 85T-70-410, manufactured by TOYOBO Co., Ltd.) were round braided into a composite yarn.

The obtained composite yarn was dipped in an aqueous dispersion prepared by diluting an adhesive resin comprising a polyolefin resin and a polyurethane resin of which the glass transition point is 30° C. or higher (Arrowbase SAW-1220, manufactured by Unitika Ltd.) with water at a dilution ratio of 1:1 by mass, and then drawn at a drawing rate of 1.0, 1.3, 1.5, or 1.8 at a drawing temperature of 140° C. Excess resin was squeezed out in the drawing.

The fineness, straight line strength, straight line break elongation, knot strength, knot break elongation, and specific gravity of the obtained yarn; and the break status of the core yarn are shown in Table 4. As Table 4 clearly shows, at any drawing rate, the core yarn was broken.

TABLE 4

| Drawing rate | 1.0 | 1.3 | 1.5 | 1.8 |
|---|---|---|---|---|
| Fineness (dtex) | 831 | 640 | 551 | 447 |
| Break status | Good | Good | Good | Good |
| Straight line strength (N) | 196.98 | 189.97 | 164.76 | 113.87 |
| Straight line break elongation (%) | 6.6 | 4.9 | 3.8 | 3.2 |
| Knot strength (N) | 65.42 | 62.61 | 59.82 | 49.63 |
| Knot break elongation (%) | 3.0 | 2.8 | 2.1 | 1.7 |
| Specific gravity | 1.01 | 1.01 | 1.01 | 1.01 |

Composite Yarn Production Example 5

An Adhesive Resin was Applied to a Braided Composite Yarn Before Drawing Under Heating Around a 630-d glass bulky yarn (trade name: TDE70, manufactured by Unitika Glass Fiber Co., Ltd.) as a core yarn, eight 200-d filaments made of an ultra high molecular weight polyethylene fiber (trade name: Dyneema SK71 220T-192-410, manufactured by TOYOBO Co., Ltd.) were round braided into a composite yarn.

The obtained composite yarn was dipped in an aqueous dispersion prepared by diluting an adhesive resin comprising a polyolefin resin and a polyurethane resin of which the glass transition point is 30° C. or higher (Arrowbase SAW-1220, manufactured by Unitika Ltd.) with water at a dilution ratio of 1:1 by mass, and then drawn at a drawing rate of 1.0, 1.2, 1.7, or 2.0 at a drawing temperature of 140° C. Excess resin was squeezed out in the drawing.

The fineness, straight line strength, straight line break elongation, knot strength, knot break elongation, and specific gravity of the obtained yarn; and the break status of the core yarn are shown in Table 5. As Table 5 clearly shows, at any drawing rate, the core yarn was broken.

TABLE 5

| Drawing rate | 1.0 | 1.2 | 1.7 | 2.0 |
|---|---|---|---|---|
| Fineness (dtex) | 2736 | 2301 | 1641 | 1406 |
| Break status | Good | Good | Good | Good |
| Straight line strength (N) | 278.51 | 283.80 | 252.82 | 235.36 |
| Straight line break elongation (%) | 8.8 | 5.0 | 3.5 | 2.8 |
| Knot strength (N) | 145.24 | 146.12 | 115.33 | 90.52 |
| Knot break elongation (%) | 6.8 | 4.6 | 2.6 | 2.0 |
| Specific gravity | 1.17 | 1.17 | 1.17 | 1.17 |

Composite Yarn Production Example 6

An Adhesive Resin was Applied to a Braided Composite Yarn Before Drawing Under Heating Around a 203-d glass filament yarn (trade name: Glass Yarn D450 1/2 4.4S, manufactured by Unitika Glass Fiber Co., Ltd.) as a core yarn, eight 200-d filaments made of an ultra high molecular weight polyethylene fiber (trade name: Dyneema SK71 220T-192-410, manufactured by TOYOBO Co., Ltd.) were round braided into a composite yarn.

The obtained composite yarn was dipped in an aqueous dispersion prepared by diluting an adhesive resin comprising a polyolefin resin and a polyurethane resin of which the glass transition point is, 30° C. or higher (Arrowbase SAW-1220, manufactured by Unitika Ltd.) with water at a dilution ratio of 1:1 by mass, and then drawn at a drawing rate of 1.0, 1.3, 1.5, or 1.8 at a drawing temperature of 140° C. Excess resin was squeezed out in the drawing.

The fineness, straight line strength, straight line break elongation, knot strength, knot break elongation, and specific gravity of the obtained yarn; and the break status of the core yarn are shown in Table 6. As Table 6 clearly shows, in the case where a glass yarn (long fiber) was used as a core yarn and a long fiber was used for braiding as a sheath part, the core yarn was not broken at a drawing rate of 1.0, but broken when drawn at a rate of 1.3 or more.

The yarn drawn at 1.5 had a higher knot strength, despite the lower fineness, than the yarn drawn at 1.3. The reason is considered to be that the glass yarn in the core part was drawn at a higher rate and favorably broken.

TABLE 6

| Drawing rate | 1.0 | 1.3 | 1.5 | 1.8 |
|---|---|---|---|---|
| Fineness (dtex) | 2356 | 1793 | 1573 | 1297 |
| Break status | Poor | Good | Good | Good |
| Straight line strength (N) | 408.00 | 304.87 | 328.78 | 268.57 |
| Straight line break elongation (%) | 4.8 | 3.8 | 3.0 | 2.4 |
| Knot strength (N) | 129.65 | 84.67 | 98.45 | 98.23 |
| Knot break elongation (%) | 3.2 | 2.8 | 2.4 | 2.1 |
| Specific gravity | 1.05 | 1.05 | 1.05 | 1.05 |

Composite Yarn Production Example 7

Around a 396-d fluororesin filament (trade name: Hastex FEP440dT/48f, manufactured by TOYO POLYMER Co., Ltd.) as a core yarn, eight 100-d filaments made of an ultra high molecular weight polyethylene fiber (trade name: Dyneema SK71 110T-96-410, manufactured by TOYOBO Co., Ltd.) were round braided into a composite yarn.

The obtained composite yarn was dipped in an aqueous dispersion prepared by diluting an adhesive resin comprising a polyolefin resin and a polyurethane resin of which the glass transition point is 30° C. or higher (Arrowbase SAW-1220, manufactured by Unitika Ltd.) with water at a dilution ratio of 1:1 by mass, and then drawn at a drawing rate of 1.0, 1.3, 1.5, or 1.8 at a drawing temperature of 140° C. Excess resin was squeezed out in the drawing.

The fineness, straight line strength, straight line break elongation, knot strength, knot break elongation, and specific gravity of the obtained yarn; and the break status of the core yarn are shown in Table 7. As Table 7 clearly shows, in the case where a fluororesin filament (long fiber) was used as a core yarn and a long fiber was used for braiding as a sheath part, the core yarn was not broken at a drawing rate of 1.0, but broken when drawn at a rate of 1.3 or more.

TABLE 7

| Drawing rate | 1.0 | 1.3 | 1.5 | 1.8 |
|---|---|---|---|---|
| Fineness (dtex) | 1489 | 1133 | 994 | 820 |
| Break status | Poor | Good | Good | Good |
| Straight line strength (N) | 220.62 | 193.89 | 168.93 | 141.11 |
| Straight line break elongation (%) | 6.6 | 3.7 | 3.1 | 2.9 |
| Knot strength (N) | 71.10 | 61.28 | 60.08 | 47.73 |
| Knot break elongation (%) | 3.2 | 2.8 | 2.2 | 1.8 |
| Specific gravity | 1.18 | 1.18 | 1.18 | 1.18 |

The invention claimed is:

1. A fishing line comprising a composite yarn having a core-sheath structure, the composite yarn comprising a core part having a core yarn containing a short fiber and a sheath part having a sheath yarn containing a long fiber, the core yarn and the sheath yarn being integrated with use of an adhesive resin, the fishing line having a history of a drawing treatment under heating or without heating in a production process of the composite yarn,
    wherein the long fiber comprises an ultra high molecular weight polyethylene fiber and the short fiber comprises a fluororesin fiber,
    wherein the adhesive resin comprises a polyolefin resin and a polyurethane resin of which a glass transition point is 30° C. or higher, and
    wherein a mass ratio of the polyolefin resin to polyurethane resin of which a glass transition point is 30° C. or higher is in the a range of 97/3 to 10/90.

2. The fishing line according to claim 1, wherein the sheath yarn in the sheath part is wound around the core yarn.

3. The fishing line according to claim 1, wherein the polyolefin resin is a modified polyolefin resin comprising a first component comprising an unsaturated carboxylic acid or an anhydride thereof, a second component comprising an olefin hydrocarbon, and a third component comprising at least one compound selected from the group consisting of an acrylate ester, a maleate ester, a vinyl ester, and acrylamide.

4. The fishing line according to claim 3, wherein a content of the first component in the polyolefin resin is not less than 0.01% by mass of the polyolefin resin and less than 5% by mass of the polyolefin resin, and wherein a mass ratio of the second component to the third component is in a range of 55/45 to 99/1.

5. The fishing line according to claim 1, wherein the core yarn further comprises two or more core yarns and the sheath yarn further comprises two or more sheath yarns, and wherein the two or more core yarns or the two or more sheath yarns are paralleled, twisted or braided.

* * * * *